J. G. BECKER.
POULTRY WATERING DEVICE.
APPLICATION FILED MAY 6, 1908.
910,039.
Patented Jan. 19, 1909.
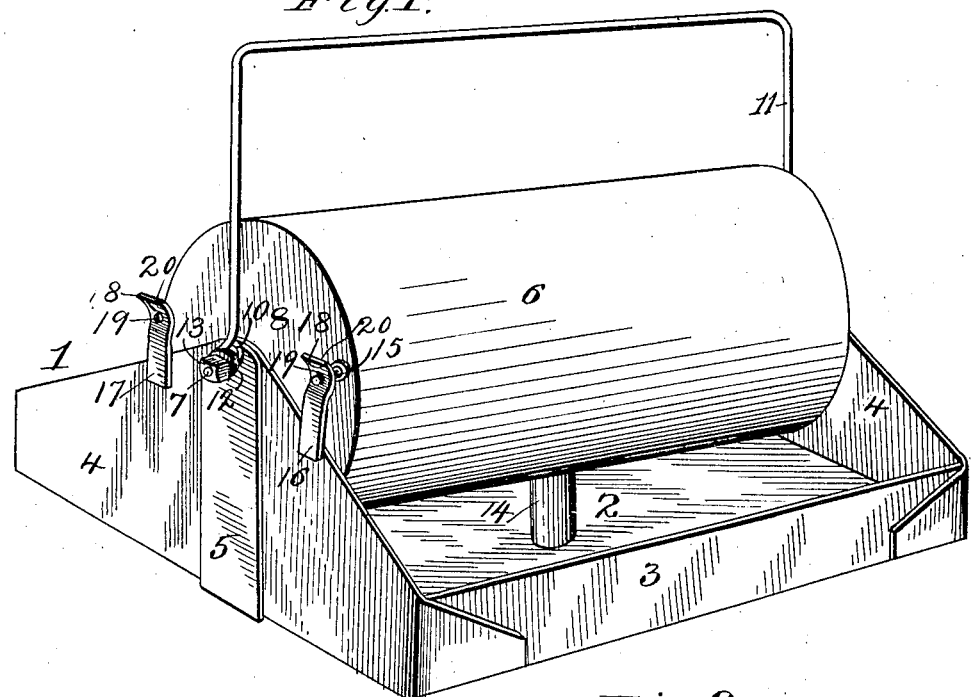
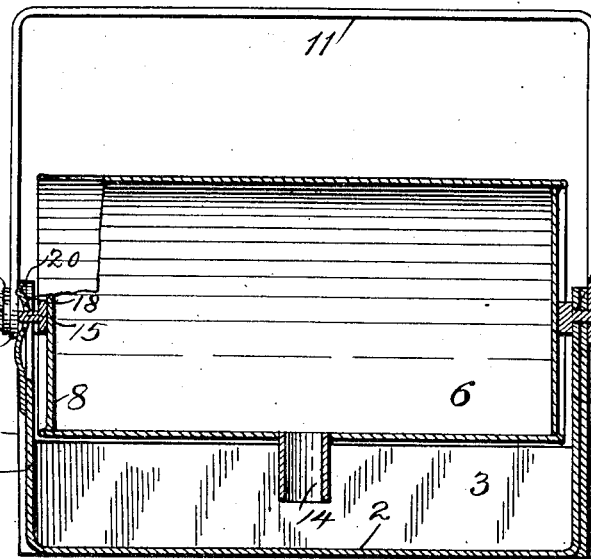
Witnesses
M. L. Skinner.
W. R. Edelen,
Inventor
J. G. Becker,
By Watson E. Coleman
Attorney

UNITED STATES PATENT OFFICE.

JOHN G. BECKER, OF PARKSTON, SOUTH DAKOTA.

POULTRY WATERING DEVICE.

No. 910,039.          Specification of Letters Patent.          Patented Jan. 19, 1909.

Application filed May 6, 1908. Serial No. 431,190.

*To all whom it may concern:*

Be it known that I, JOHN G. BECKER, a citizen of the United States, residing at Parkston, in the county of Hutchinson and State of South Dakota, have invented certain new and useful Improvements in Poultry Watering Devices, of which the following is a specification, reference being had to the accompanying drawings.

My invention relates to improvements in poultry watering devices, and it consists of the novel features of construction and the combination and arrangement of parts hereinafter fully described and claimed.

The object of the invention is to improve and simplify the construction and operation of devices of this character and thereby render them stronger, more durable and convenient and less expensive.

The above and other objects of the invention are attained in its preferred embodiment illustrated in the accompanying drawings, in which—

Figure 1 is a perspective view of my improved watering trough; and Fig. 2 is a vertical longitudinal section partly on the central plane and partly on a plane to one side of the center.

In the drawings 1 denotes a trough preferably of rectangular shape having a flat bottom 2, upright sides 3 and upright triangular-shaped ends 4. The trough is preferably constructed of sheet metal and its ends 4 are reinforced by centrally and vertically disposed strengthening strips 5 soldered or otherwise secured upon their outer faces.

6 denotes the water receptacle which is preferably in the form of a cylinder disposed horizontally and longitudinally above the trough 1 and mounted for rotation upon pivot studs or journals 7 which project from the centers of the ends or heads 8 of the receptacle and are arranged in bearing openings 9 formed in the ends 4 and reinforcing strips 5 of the trough, as clearly shown in Fig. 2. The projecting portions of the pivots 7 are adapted to receive eyes 10 formed upon the ends of a U-shaped bail handle 11 by means of which the device may be conveniently carried. The extremities of said pivots 7 are screw threaded to receive washers 12 and nuts 13 by means of which latter the parts are held assembled so that both the receptacle and the handle may swing or rotate freely.

At a suitable point in the side of the receptacle 6 is a tubular outlet 14 adapted to project beneath the level of the water in the trough 1. This outlet is adapted to serve as an inlet when the receptacle 6 is turned to bring it to the upper side, but when it is turned to the lower side and has its extremity submerged in the water in the trough the water in the receptacle will be automatically fed to the trough and a constant level maintained therein.

In order to fasten the receptacle in either its upright or inverted position I provide a locking device which consists of a fixed pivot stud or pin 15 upon one of the ends or heads 8 of the receptacle adjacent to the edge of the latter and two co-acting latch plates 16, 17 upon the adjacent end 4 of the trough. These latch or keeper members 16, 17 are in the form of plates or strips of resilient metal, the lower ends of which are soldered or otherwise secured to the end 4 of the trough at equal distances from the pivot or bearing opening 9 in said end and the projecting upper ends of which are curved first inwardly and then outwardly, as shown more clearly in Fig. 2. In the highest points of the curved portions 18 of said latch plates are formed openings 19 to receive the stud or projection 15 and the outwardly curved upper extremities 20 of said latch plates are adapted to serve as finger pieces by means of which they may be readily retracted to disengage them from said stud. It will be seen that when the receptacle is rotated to its inverted position the stud 15 will engage the opening in the latch 17 to lock the receptacle in such position and when it is turned to its upright position said stud will spring into the opening in the other latch 16 to lock the receptacle in the latter position.

From the foregoing it will be seen that my improved watering device or trough is exceedingly simple in construction so that it may be produced at a small cost and will be exceedingly strong and durable. The improved locking means for the rotary receptacle is exceedingly simple, strong and durable and at the same time easy to manipulate.

Having thus described my invention what I claim is:

The herein described poultry watering device comprising a rectangular trough having its end walls extended upwardly to provide uprights, the latter being formed with openings adjacent their upper edges, a rotary receptacle arranged above the trough and between the uprights and provided upon one side with an outlet adapted to be submerged in the contents of the trough, fixed pivot studs projecting from the centers of the ends of the receptacle and arranged for rotation in the openings in the uprights, the extremities of said pivot studs being screw threaded, a swinging bail handle having eyes at its ends to engage said pivot studs, retaining nuts upon the threaded extremities of said pivot studs, a fixed pin projecting longitudinally from one end of said receptacle, and upright resilient latch plates secured at their lower ends upon one of said uprights on opposite sides of its center, each of said latch plates having its upper end curved and formed with an opening to receive said pin upon the receptacle, whereby the latter will be locked in either its upright or inverted position.

In testimony whereof I hereunto affix my signature in the presence of two witnesses.

JOHN G. BECKER.

Witnesses:
D. RENKE,
LYDIA TIEDE.